United States Patent
Murakami et al.

(10) Patent No.: US 8,670,148 B2
(45) Date of Patent: Mar. 11, 2014

(54) IMAGE PROCESSING APPARATUS, JOB MANAGEMENT METHOD FOR THE SAME, AND RECORDING MEDIUM HAVING RECORDED THEREON JOB MANAGEMENT PROGRAM

(75) Inventors: Masakazu Murakami, Itami (JP); Atsushi Ohshima, Amagasaki (JP); Tomonari Yoshimura, Kyoto (JP); Masami Yamada, Sennan-gun (JP); Takahiro Ikeda, Tondabayashi (JP)

(73) Assignee: Konica Minolta Business Technologies, Ltd., Chiyoda-Ku, Tokyo (JP)

( * ) Notice: Subject to any disclaimer, the term of this patent is extended or adjusted under 35 U.S.C. 154(b) by 983 days.

(21) Appl. No.: 12/073,444

(22) Filed: Mar. 5, 2008

(65) Prior Publication Data
US 2008/0246993 A1 Oct. 9, 2008

(30) Foreign Application Priority Data

Apr. 3, 2007 (JP) ................................. 2007-097104

(51) Int. Cl.
*G06K 15/00* (2006.01)
(52) U.S. Cl.
USPC .......................... 358/1.18; 358/1.15; 358/1.1
(58) Field of Classification Search
USPC ........................................ 358/1.18, 1.15, 1.1
See application file for complete search history.

(56) References Cited

U.S. PATENT DOCUMENTS

| | | | | |
|---|---|---|---|---|
| 2003/0081238 A1* | 5/2003 | Lester et al. | ................. | 358/1.14 |
| 2003/0137682 A1* | 7/2003 | Sakai et al. | .................. | 358/1.13 |
| 2005/0275868 A1* | 12/2005 | Higashiura et al. | .......... | 358/1.14 |
| 2006/0187486 A1* | 8/2006 | Tsuchitoi | ..................... | 358/1.15 |
| 2006/0221359 A1* | 10/2006 | Mokuya | ......................... | 358/1.1 |
| 2006/0250631 A1* | 11/2006 | Igarashi | ....................... | 358/1.13 |
| 2007/0257954 A1* | 11/2007 | Nishizaka et al. | .............. | 347/14 |

FOREIGN PATENT DOCUMENTS

| | | |
|---|---|---|
| JP | 2002-108583 | 4/2002 |
| JP | 2003-244355 A | 8/2003 |
| JP | 2004-54355 A | 2/2004 |
| JP | 2005-216244 A | 8/2005 |

OTHER PUBLICATIONS

Noboru Hamada, Printing System, Method for Controlling Printing System Program, and Recording Medium, Aug. 11, 2005, JP 2005216244 A.*

Notification of Reasons for Refusal in JP 2007-097104 dated Apr. 28, 2009, and an English Translation thereof.

* cited by examiner

*Primary Examiner* — Benny Q Tieu
*Assistant Examiner* — Martin Mushambo
(74) *Attorney, Agent, or Firm* — Buchanan Ingersoll & Rooney PC

(57) ABSTRACT

Upon reception of a job, a control unit of an image processing apparatus executes processing for judging whether any cancellation factor exists. If there is no cancellation factor, the control unit outputs pages relating to the job, stores page information thereof, and updates execution history information after outputting all the pages. If there is any cancellation factor, the control unit performs only preparation for output of the pages, stores page information obtained through the preparation, and updates cancellation history information after storing the page information of all the pages. A message as a result of evaluation of the cancellation history information is displayed on an operation panel. The message prompts an administrator to change management condition as needed.

18 Claims, 15 Drawing Sheets

FIG.3

AVAILABLE FUNCTION TABLE

| | FUNCTION | AVAILABILITY |
|---|---|---|
| ① | BLACK AND WHITE PRINTING | ○ |
| ② | COLOR PRINTING | ○ |
| ③ | SCAN | ○ |
| ④ | DOUBLE-SIDED PRINTING | ○ |
| ⑤ | STAPLE | ○ |
| ⑥ | PUNCH | × |
| ⑦ | A4 | ○ |
| ⑧ | B5 | ○ |
| ⑨ | LETTER SIZE | × |

FIG.4

JOB MANAGEMENT TABLE

| USER ID | DIVISION | UPPER LIMIT (PRINT) | | UPPER LIMIT (SCAN) | | PROHIBITED JOB TYPE |
|---|---|---|---|---|---|---|
| | | COLOR | B W | COLOR | B W | |
| 0001 | SALES DIVISION 1 | 1000 | 1000 | 200 | 300 | N/A |
| 0002 | SALES DIVISION 1 | 1010 | 2000 | 100 | 100 | N/A |
| 0003 | SALES DIVISION 1 | 2000 | 3000 | 200 | 300 | N/A |
| 0004 | SALES DIVISION 2 | 400 | 500 | 100 | 100 | N/A |
| 0005 | SALES DIVISION 2 | — — | 400 | 200 | 300 | COLOR PRINGING |
| 0006 | SALES DIVISION 2 | 200 | 300 | — — | 100 | COLOR SCANNING |
| · | · | · | · | · | · | · |

FIG.5

HISTORY INFORMATION MANAGEMENT TABLE (JANUARY, 2007)

| USER ID | EXECUTION HISTORY INFORMATION | | | | CANCELLATION HISTORY INFORMATION | | | |
|---|---|---|---|---|---|---|---|---|
| | EXECUTION COUNTER (PRINT) | | EXECUTION COUNTER (SCAN) | | VIRTUAL COUNTER (PRINT) | | VIRTUAL COUNTER (SCAN) | |
| | COLOR | B W | COLOR | B W | COLOR | B W | COLOR | B W |
| 0001 | 700 | 200 | 200 | 10 | 0 | 0 | 0 | 0 |
| 0002 | 900 | 1800 | 80 | 90 | 0 | 0 | 0 | 0 |
| 0003 | 2100 | 3300 | 140 | 280 | 100 | 300 | 140 | 0 |
| 0004 | 300 | 400 | 80 | 90 | 0 | 0 | 0 | 0 |
| 0005 | 0 | 350 | 150 | 200 | 40 | 0 | 0 | 0 |
| 0006 | 150 | 280 | 0 | 80 | 0 | 0 | 0 | 0 |

FIG.8

EXECUTED-JOB PROCESSING INFORMATION

<u>JOB INFORMATION PART</u>
NAME : a b c . d o c
RESULT : NORMAL
JOB TYPE : PRINT
RECEPTION DATE : 2 0 0 7 . 1 . 2 5
START TIME : 1 2 : 0 0
END TIME : 1 2 : 1 0
USER ID : 0 0 0 3
DOUBLE-SIDED : O N
STAPLE : O F F
PUNCH : O F F
Host Computer : 150.16.1.1
Host Name : Workgroup
TOTAL PAGES : 2 5

<u>PAGE INFORMATION PART</u>

PAGE No. : 1
SIZE : A 4
COLOR : O N
COVERAGE Y : 4 0
COVERAGE M : 4 0
COVERAGE C : 0
COVERAGE K : 2 0
FACE : FRONT

PAGE No. : 2
SIZE : A 4
COLOR : O N
COVERAGE Y : 4 0
COVERAGE M : 4 0
COVERAGE C : 0
COVERAGE K : 2 0
FACE : REVERSE
·
·
·
·
·

FIG.9

CANCELLED-JOB PROCESSING INFORMATION

JOB INFORMATION PART

NAME : a b c . d o c
RESULT : CANCELLED
CANCELLATION FACTOR : OVERLIMIT
JOB TYPE : PRINT
RECEPTION DATE : 2 0 0 7 . 1 . 2 5
START TIME : 1 2 : 0 0
END TIME : 1 2 : 1 0
USER ID : 0 0 0 3
DOUBLE-SIDED : O N
STAPLE : O F F
PUNCH : O F F
Host Computer : 150.16.1.1
Host Name : Workgroup
TOTAL PAGES : 2 5
PROCESSED PAGES : 5

PAGE INFORMATION PART

PAGE No. : 1
SIZE : A 4
COLOR : O N
COVERAGE Y : 4 0
COVERAGE M : 4 0
COVERAGE C : 0
COVERAGE K : 2 0
FACE : FRONT

PAGE No. : 2
SIZE : A 4
COLOR : O N
COVERAGE Y : 4 0
COVERAGE M : 4 0
COVERAGE C : 0
COVERAGE K : 2 0
FACE : REVERSE

```
LETTER-SIZE PRINT JOB WAS CANNCELLD BY USER THIS
MONTH DUE TO SIZE MISMATCH.
1000 PRINTS WERE CANCELLED.
DO YOU RECONFIGURE MAGEMENT CONDITION TO PRINT
LETTER-SIZE JOB ON A4-SIZE SHEET?
```

YOU ARE RECOMMENDED TO BUY 1000 SHEETS OF LETTER-SIZE PAPER.

2006 CANCELLATION HISTORY INFORMATION (PRINT JOB : COLOR)

| USER ID | APRIL | MAY | JUNE | JULY | AUGUST | SEPTEMBER | OCTOBER | NOVEMBER | DECEMBER | JANUARY | FEBRUARY | MARCH |
|---|---|---|---|---|---|---|---|---|---|---|---|---|
| 0001 | 0 | 0 | 0 | 0 | 0 | 0 | 0 | 0 | 0 | 0 | 0 | 0 |
| 0002 | 0 | 0 | 0 | 0 | 0 | 0 | 0 | 0 | 0 | 0 | 0 | 0 |
| 0003 | 10 | 200 | 300 | 0 | 0 | 10 | 10 | 60 | 50 | 70 | 100 | 300 |
| 0004 | 0 | 0 | 0 | 0 | 0 | 0 | 0 | 0 | 0 | 0 | 0 | 0 |
| 0005 | 0 | 10 | 0 | 20 | 20 | 0 | 0 | 21 | 20 | 0 | 40 | 0 |
| ⋮ | | | | | | | | | | | | |

IMAGE PROCESSING APPARATUS, JOB MANAGEMENT METHOD FOR THE SAME, AND RECORDING MEDIUM HAVING RECORDED THEREON JOB MANAGEMENT PROGRAM

This application is based on Application No. 2007-97104 filed in Japan, the content of which is hereby incorporated by reference.

BACKGROUND OF THE INVENTION (1) Field of the Invention

The present invention relates to an image processing apparatus that is capable of performing per-user job management, a job management method used by the image processing apparatus, and a recording medium having recorded thereon a job management program.

(2) Description of the Related Art

In offices or the likes, an image processing apparatus such as a copier and a printer is generally shared by a plurality of users. In such a usage environment, in order to manage execution load of jobs requested by each user, the image processing apparatus has, for example, a structure in which an upper limit of the execution load is set for each user so as to cancel or suspend a job that exceeds the upper limit.

Specifically, a print system disclosed in Japanese Laid-open Patent Application Publication No. 2005-216244 has the following structure for preventing users from exceeding the upper limit of a printable number of copies which has been set for each user: When a printer receives a print job from a user as a job issuer, the printer acquires the remaining printable number permitted for the job issuer from a database, and judges whether to permit execution of the print job based on whether or not the remaining printable number is sufficient for executing the job.

Also, an image processing apparatus disclosed in Japanese Laid-open Patent Application Publication No. 2003-244355 has the following structure: For outputting image data, the image processing apparatus suspends the output of the image data if a count value reaches a maximum count value that has been set previously; The image data is to be temporarily stored such that the job can be resumed when the maximum count value is set again.

However, in the conventional image processing apparatuses, the count value is stored as a historic record as to only jobs that have been already executed, for the purpose of judging whether to permit execution of a job.

Accordingly, when reviewing the management data, an administrator or the like of the image processing apparatus can not grasp the exact execution load of jobs actually requested by users. As a result, inconveniently, it is impossible to configure precise job management conditions that fulfill users' demand.

SUMMARY OF THE INVENTION

The present invention is made in view of the above-mentioned problem. The object of the present invention is to provide an image processing apparatus, a job management method, a program and a recording medium that enable users to fully grasp status of job requests actually issued by the users, and realize precise job management that reflects the users' demand.

The above object is fulfilled by an image processing apparatus that manages execution load of jobs issued by each user, comprising: a canceling part operable to cancel a received job according to a prescribed factor; a cancellation history storage operable to store therein cancellation history information that shows a value of execution load on the image processing apparatus estimated on an assumption that the cancelled job had been actually executed; and a display part operable to display the cancellation history information.

Here, the term "image processing apparatus" refers to an apparatus that processes and outputs image data in a particular manner, such as a printer, a scanner, a copier and a fax.

The term "load" on the image processing apparatus numerically shows the value of load applied on the image processing apparatus when executing a received job. For example, if the received job is an image formation job, the load represents the image formation count or a value indicating the amount of toner used for the image formation. If the received job is a scan job, the load represents the scan count or a value indicating the capacity required for storing the scanned data.

With the stated structure, even if a job has been cancelled and has not been executed due to a certain factor, the load estimated on an assumption that the cancelled job had been actually executed is to be stored as the cancellation history information which is to be displayed on the display part. Therefore, for reconsidering the configuration of the job management conditions, the administrator of the image processing apparatus, for example, can reflect the users' actual demands to the conditions with reference to the displayed information. Accordingly, it is possible to realize reasonable job management.

Here, the cancelled job may be an image formation job for forming images on a recording sheet, and the cancellation history information may show an image formation count included in the cancelled job, estimated on an assumption that the cancelled job had been actually executed.

With the stated structure, it is possible to fully grasp information as to requests for image forming jobs issued in the past, which contributes to effective job management.

Here, the "image formation job" is an idea that includes both a "print job" and a "copy job" described later.

Also, the cancelled job may be an image scan job for scanning images from a document to generate image data, and the cancellation history information may show an image scan count included in the cancelled job, estimated on an assumption that the cancelled job had been actually executed.

With the stated structure, in the image processing apparatus having an image scan function, the administrator can fully grasp information as to requests for image forming jobs issued in the past, which contributes to effective job management.

Furthermore, the image processing apparatus may further comprise a management condition storage storing a management condition that has been set for each user, wherein the canceling part may refer to the management condition to cancel the job.

Furthermore, the management condition may be an upper limit of execution load of jobs that each user is allowed to apply on the image processing apparatus, the image processing apparatus may further comprise a total value storage operable to store therein, for each user, a total value of execution load applied on the image processing apparatus through execution of jobs issued by the user, and if the total value of execution load reaches the upper limit due to a received job, the canceling part may cancel the job.

With the stated structure, it is possible to manage the execution load of jobs so as not to exceed the upper limit of the execution load set for each user.

Furthermore, the image processing apparatus may further comprise an evaluation part operable to evaluate the cancellation history information.

Furthermore, the display part may display, instead of the cancellation history information, a result of evaluation of the cancellation history information performed by the evaluation part.

Here, the display part may display, in addition to the cancellation history information, a result of evaluation of the cancellation history information performed by the evaluation part.

With the stated structures, the administrator of the image processing apparatus can easily change the management condition with reference the evaluation result.

Also, the result of the evaluation may include a recommendation to change the management condition for a particular user according to the cancellation history information.

With the stated structure, the administrator can easily change the management conditions for a user that has issued a large number of jobs, for example.

Also, the image processing apparatus may further comprise a changing part operable to change the management condition according to a result of evaluation of the cancellation history information performed by the evaluation part.

With the stated structure, it is possible to automatically change the management conditions based on the result of the evaluation by the evaluation part, which is convenient for the administrator.

Furthermore, the image processing apparatus may further comprise an input receiver operable to receive a user's input for changing the management condition; and a changing part operable to change the management condition stored in the management condition storage part, in accordance with the user's input.

With the stated structure, the administrator or the like of the image processing apparatus can change the management conditions based on the cancellation history information described above.

Also, the image processing apparatus may further comprise a request receiver operable to receive, from a client terminal, a request for transmitting the cancellation history information; and a transmitter operable to transmit the cancellation history information to the client terminal upon reception of the request.

With the stated structure the administrator can refer to the cancellation history information from the client terminal without going and checking on the image processing apparatus.

The present invention may also be implemented as a job management method used in the above-stated image processing apparatus, or a recording medium on which a job management program for performing the job management method has been recorded.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is an example of an available function table stored in a function information storage unit included in a control unit;

FIG. 4 is an example of a job management table stored in a job management information storage unit included in the control unit;

FIG. 5 is an example of a history information management table stored in a history information storage unit included in the control unit;

FIG. 8 shows an example of job processing information that is generated when execution of a print job has been normally completed;

FIG. 9 shows an example of job processing information that is generated when a print job has been cancelled;

FIG. 14 is a third example message to the administrator displayed in accordance with a cancellation factor;

FIG. 15 is a fourth example message to the administrator displayed in accordance with a cancellation factor;

FIG. 17 shows, as an output example of history information, a per-month history of cancellations of color-print jobs recorded in one year.

DESCRIPTION OF THE PREFERRED EMBODIMENT

The following describes an embodiment of the present invention based on an example of a multi function peripheral (Hereinafter called an MFP) that is connectable to a network and has a plurality of functions such as functions of a printer, a scanner and a copier.

(1) Structure of Image Processing System

Figure 1:
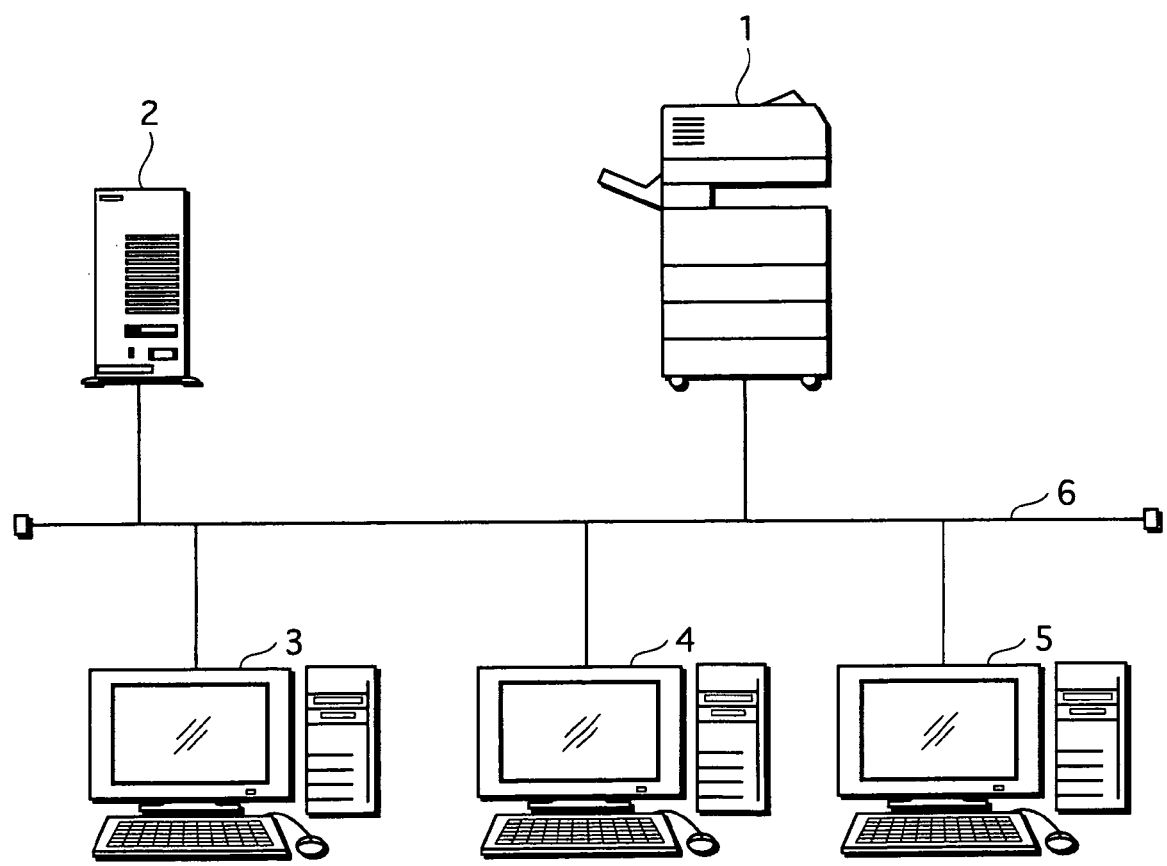
FIG. 1 is a block diagram showing an example structure of an image processing system that includes an MFP 1 pertaining to an embodiment of the present invention.

FIG. 1 shows an example structure of an image processing system 100 that includes an MFP 1 pertaining to an embodiment of the present invention.

As FIG. 1 shows, the image processing system 100 includes the MFP 1, a file server 2 and client terminals 3, 4 and 5, which are connected to a LAN (local area network) 6.

In the image processing system 100, the user can directly operate an operation panel of the MFP 1 to cause the MFP 1 to perform operations such as a copy job and a scan job. Also, from client terminals 3 to 5 structured from personal computers via the LAN 6, the user can request the MFP 1 to perform a print job and a scan job.

Here, the "copy job" is a job of scanning an image of an original document by a scanner to acquire image data, and performing an image formation operation based on the acquired image data to reproduce the image of the original document on a sheet of paper. The "scan job" is a job of scanning an image of an original document by a scanner to acquire image data, and storing the image data therein or in a server, or transferring the image data to a client terminal.

The "print job" is a job of receiving data mainly from a client terminal, and forming an image based on the received data.

In the MFP 1, upper limits of the number of image formation operations (hereinafter called "the image formation count") and the number of image scan operations (hereinafter called "the image scan count") for each month are set for each user. If the count reaches the upper limit, the job issued by the relevant user is automatically cancelled.

In this embodiment, the MFP 1 does not discard the data of cancelled jobs immediately. Instead, the MFP 1 stores, as cancellation history information, information that would have been stored if the jobs were actually executed so that the administrator of the MFP 1 can evaluate the information as reference for configuring the job management conditions for the MFP 1.

(2) Structure of MFP 1

Figure 2:
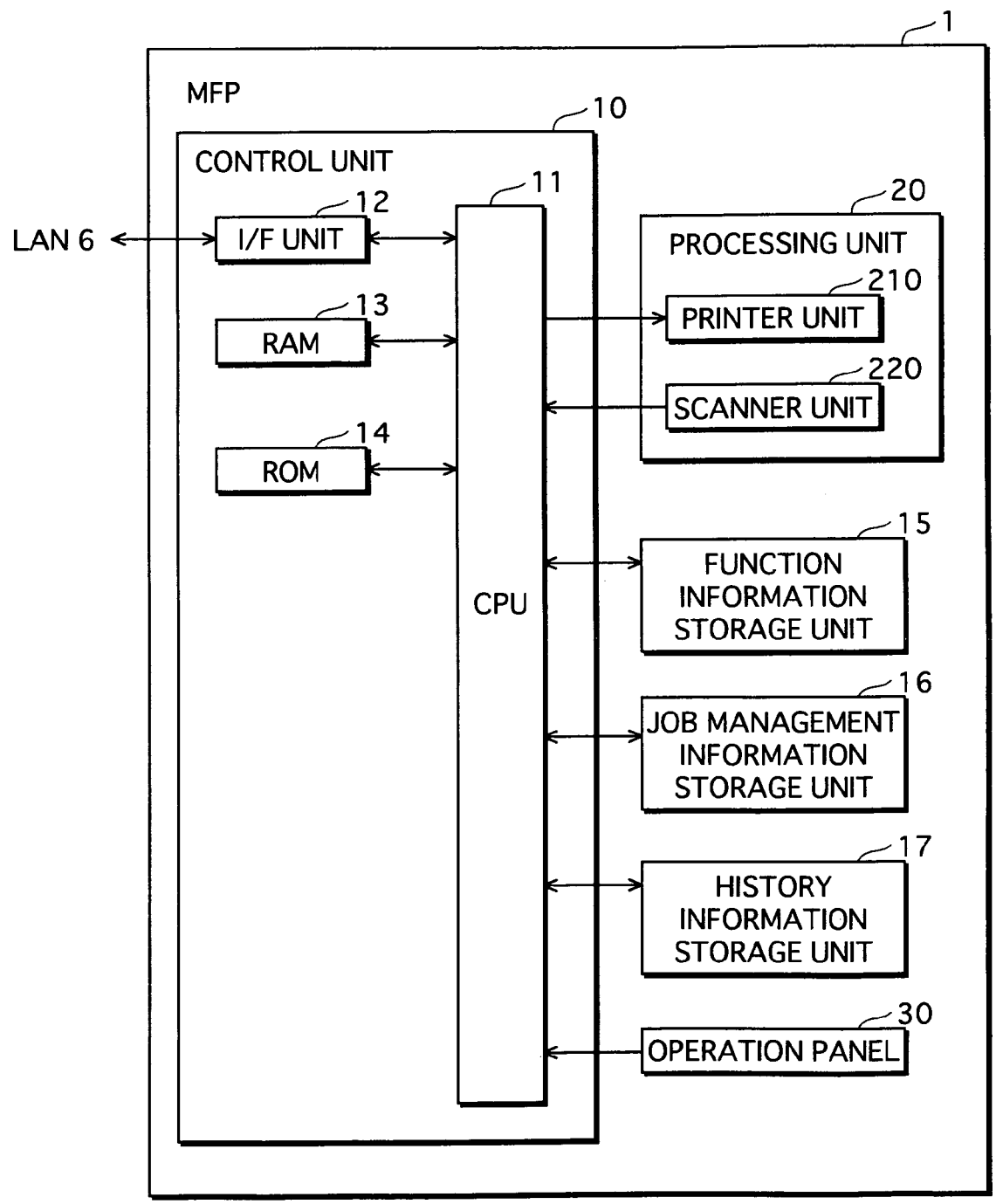
FIG. 2 is a block diagram showing a structure of the MFP 1.

FIG. 2 is a block diagram showing the structure of the MFP 1.

As FIG. 2 shows, the MFP 1 includes, as main components, a control unit 10, a function information storage unit 15, a job management information storage unit 16, a history information storage unit 17, a processing unit 20 and an operation panel 30.

The processing unit 20 performs output processing and input processing of images, and includes, specifically, a printer unit 210 and a scanner unit 220.

The printer unit 210 is consisted of a well-known printer engine of the laser type or the ink-jet type. The scanner unit 220 also is a well-known device which scans image on a placed document by a CCD sensor or the like to generate image data.

The operation panel 30 includes hard keys such as a numeric key pad and a start key, and also includes a display unit 31 (see FIG. 12 to FIG. 15) that includes an LCD panel that has a touch panel on the surface of the screen. The display unit 31 receives various input operations input by the user touching tabs and buttons displayed on a configuration screen of the display unit 31, and displays, as described later, a prescribed message to user.

The control unit 10 mainly includes a CPU 11, an interface (I/F) unit 12, a RAM 13 and a ROM 14.

The interface unit 12 is for performing data transmission/reception between the CPU 11 and the client terminals 3-5 and between the CPU 11 and the file server 2, via the LAN 6. The interface unit 12 includes a LAN card, a LAN board, or the like.

The RAM 13 is a volatile memory, and used as a work area for program execution by the CPU 11.

The ROM 14 stores a program for controlling operations performed by the units included in the processing unit 20, a program for job management which is described later, and so on. The CPU 11 reads a required program from the ROM 14, and controls each unit with precise timing to realize smooth operations, or perform the job management.

The function information storage unit 15 stores a table (an available function table) showing information of available functions of the MFP 1. The job management information storage unit 16 stores a table (a job management table) showing information required for the job management for each user.

The CPU 11 receives a job, and judges whether the received job has a cancellation factor, mainly based on the information stored in the function information storage unit 15 and the job management information storage unit 16 mentioned above.

The history information storage unit 17 stores history information of jobs received from each user. The history information is classified into history information of jobs that have been actually executed (hereinafter called "execution history information") and history information of jobs that have been cancelled (hereinafter called "cancellation history information").

(3) Available Function Table

FIG. 3 shows an example of the available function table stored in the function information storage unit 15. In this table, the sign "○" shows that the function is available, and the sign "×" shows that the function is not available.

As illustrated in FIG. 3, the MFP 1 pertaining to this embodiment has a print function for black and white printing and color printing, and also has a function of scanning a document to acquire image data on the document, converting the image data to an image file in a prescribed format, and transmitting the image file to a specified terminal or a file server 2 which stores the image file (This function is hereinafter simply called "the scan function"). Also, the MFP 1 is capable of double-sided printing, and also capable of stapling output copies.

The MFP 1 is capable of performing printing on A4 and B5 size paper, but the letter size is not available. Therefore, the MFP 1 can not execute a print job that designates the letter size. The MFP does not have the punching function for punching filing holes in output copies.

(4) Job Management Table

FIG. 4 shows an example of the job management table stored in the job management information storage unit 16. As FIG. 4 shows, each entry of the job management table includes identification information such as a user ID, a division that the user belongs to, a prohibited job type for the user. Each entry also includes upper limits of the print count and the scan count for each of the color printing and the black and white (BW) printing.

(5) History Management Table

FIG. 5 shows an example of the history information management table stored in the history information storage unit 17.

The length of a unit period for the job management is not limited. FIG. 5 shows an example of per-month management.

In the history information management table 17, the execution history information of each entry shows, for each of the color printing and the black and white printing, the total print count and the total scan count of jobs that have been issued by the user and actually executed in the month (e.g. "January, 2007").

The cancellation history information of each entry shows, for each of the color printing and the black and white printing, the total print count and the total scan count of jobs that have been issued by the user but cancelled in the month.

In FIG. 5, the "execution counter" shows a print count or a scan count of executed jobs, and the "virtual count" shows the total print count or scan count that would have occurred if the cancelled jobs had been executed.

The job management is performed in the following manner, with reference to tables shown in FIG. 3 to FIG. 5.

(6) Job Management by Control Unit 10

The following specifically explains the job management performed by the control unit 10, based on the assumption that that the relevant job is the print job.

<History Information Storage Processing>

Figure 6:
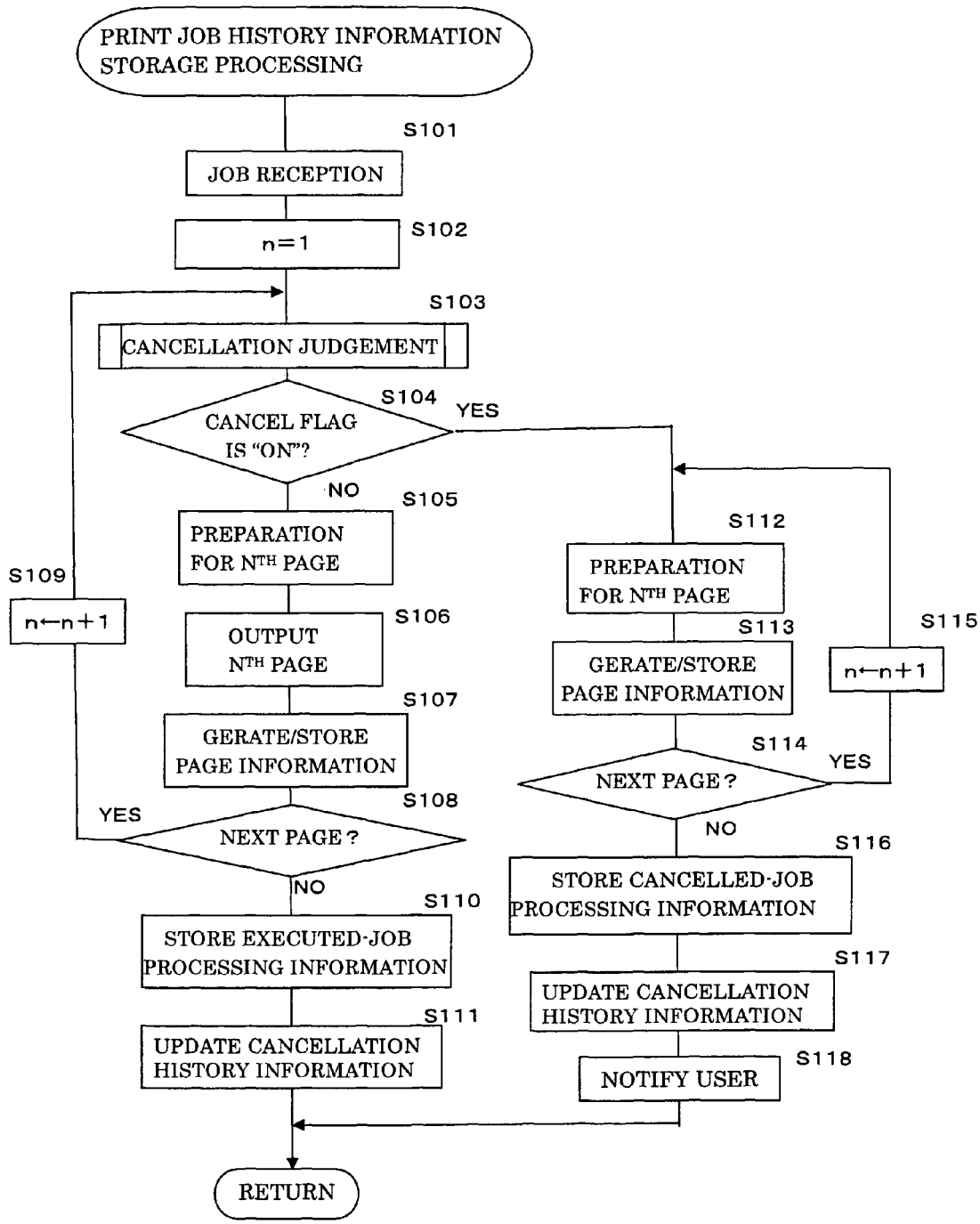
FIG. 6 is a flowchart showing print job history information storage processing performed by the control unit.

FIG. 6 is a flowchart showing history information storage processing included in print job processing.

Firstly, upon receiving a print job, the control unit 10 sets "1" to a page count "n" (Steps S101 and S102). This count value is to be stored in the RAM 13, for example.

Next, the control unit 10 executes cancellation judgment processing (Step S103). The cancellation judgment processing is performed for judging whether the received job has a cancellation factor.

Figure 7:
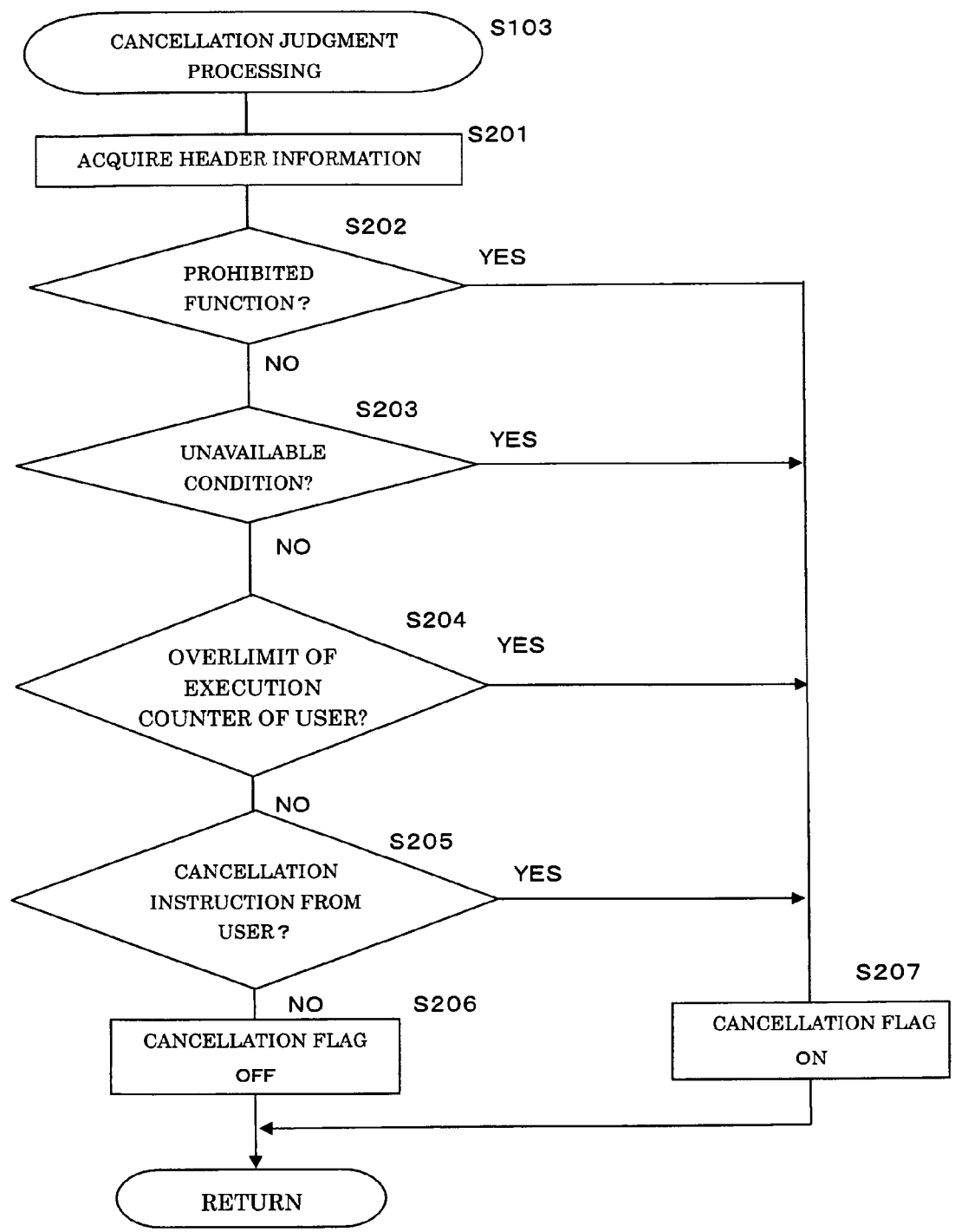
FIG. 7 is a flowchart showing a subroutine for cancellation judgment processing of Step S103 shown in FIG. 6.

FIG. 7 is a flowchart showing an example of a subroutine for the cancellation judgment processing.

Firstly, the control unit 10 acquires header information of data of the received print job (Step S201). The header information includes a print request command, and further includes job identification information such as an ID of a user that has issued the job and a job name (file name), and print configuration information such as a total page count, a paper size, information showing color printing or black and white printing, information showing whether to perform the double-sided printing, and information showing whether to perform the stapling.

The header information is attached as a header to image data to be printed, in accordance with print execution selected by the user by inputting a prescribed operation from the configuration screen for the printer driver installed in the client terminals 3-5.

Then, based on the header information, the control unit 10 judges whether the requested job requires a function that is prohibited for the relevant user, with reference to the job management table shown in FIG. 4 (Step S202).

If the user ID relating to the print job is "0005", color printing is prohibited for the user as the job management table of FIG. 4 shows. Accordingly, if the received print job includes color printing, the control unit 10 judges "YES" in Step S202, and sets a job-cancel flag to be "ON" (Step S207). This job-cancel flag is to be temporarily stored in the RAM 13, for example.

If the print job does not include any prohibited jobs (Step S202: NO), the control unit 10 performs judgment in each of Steps S203 to S205 to check whether any other cancellation factor exist.

Specifically, in step S203, the control unit 10 judges whether the received print job includes a configuration of a function that is not available in the MFP 1.

For example, if the print job requests "Punch" processing, the control unit 10 judges that the job should be cancelled, because the MFP 1 does not have the "Punch" function as shown in the available function table of FIG. 3.

In step S204, the control unit 10 judges whether the execution counter has reached the upper limit with reference to the job management table of FIG. 4. If the execution counter has reached the upper limit, the control unit 10 judges that the job should be cancelled.

The control unit 10 also sets the job-cancel flag to be "ON" if the job is cancelled in accordance with the user's operation (Step S205: YES, Step S207).

For example, this is the case where the user cancels the job after the print job is issued, because the user notices that the paper feeding cassette for paper of the designated size is empty.

If judging affirmatively ("YES") in any of Steps S202 to S205, the control unit 10 sets the job-cancel flag to be "ON" to cancel the job (Step S207), and returns to the flowchart of FIG. 6.

On the other hand, if the control unit 10 judges negatively ("NO") in all the Steps S202 to S205, the control unit 10 sets the job-cancel flag to be "OFF" (Step S206) because there is no cancellation factor, and returns to the flowchart of FIG. 6.

In addition to the above-described example conditions for the job cancellation judgment, other conditions may be used to judge whether to cancel the job, depending on the purpose of the management.

For example, in the case of an apparatus that requires a password for user authentication, the job may be cancelled because of an authentication error if a password that has been input when the job is issued and a password that is registered in the apparatus are not the same. Also, in the case of charging the user in accordance with the print count, using different rates depending on the printing is in black and white or in color, whether to cancel the job may be judged by comparing the charge converted from the print count with the upper limit of the charge.

In Step S104 of FIG. 6, the control unit 10 judges whether the job-cancel flag, which has been set in the aforementioned job-cancel judgment processing, is "ON" or not. If the flag is "OFF" (Step S104: NO), the control unit 10 prepares for outputting the $n^{th}$ page (Step S105).

Specifically, the control unit 10 extracts print data of the $n^{th}$ page from the print job data and, expands the print data to be a bit-map (If the print job is for the color printing, color data included in the print data is converted to image-development colors, namely Yellow (Y), Magenta (M), Cyan (C) and Black (K) and they are expanded to be bit-maps separately). The control unit 10 writes the bit-maps into the RAM 13 or an image memory which is not illustrated, and the printer unit 210 forms and outputs an image onto paper, based on the bit-maps (Step S106).

Then, the control unit 10 generates information of the output page (page information) and adds the page information into executed-job processing information which is described next, and stores the resultant information in the history information storage unit 17 (Step S107).

FIG. 8 shows an example of job processing information (executed-job processing information) of the case where a print job has been actually executed.

The executed-job processing information includes a job information part and a page information part. The job information part includes the information that has been acquired in Step S201 of FIG. 7 mainly from the header information of the print job, such as the job name (usually the filename), the user ID of the job issuer, ON or OFF for each of the double-sided printing function, the stapling function and the punching function, the IP address of the PC (Host Computer) that has issued the job, the computer name thereof (Host Name), the total pages, and the result of the job (Normally completed or cancelled), the reception date of the job, the start time and the end time of the job. The page information part includes the page information for each page, generated in the aforementioned Step S107, specifically, the paper size, black and white or color, and the front side or the reverse side in the case of the double-sided printing. Also, in the case of the color printing, the page information part includes the percentage (coverage) of the number of pixels included in the image, formed with each image-development color (Y, M, C, K), to the number of pixels included in the whole page. The coverage of each color directly relates to the consumption of toner. Accordingly, the coverage may be stored as the history information and used as the basis for calculating the charge. Also, the coverage may be used as reference for telling the timing of changing the toner cartridges.

In Step S107 of FIG. 6, after storing the page information in the history information storage unit 17, the control unit 10 judges whether all the pages have been output (Step S108). If there is the next page remaining to be output, the control unit 10 increments n by "1" in Step S109, and returns to Step S103 to repeat the aforementioned Steps.

Upon completion of output of all the pages, the control unit 10 writes the end time of the output into the executed-job processing information and stores the executed-job processing information in the history information storage unit 17 (Step S108: YES, Step S110). At the same time, the control unit 10 updates the execution history information based on the executed job processing information (Step S111).

Specifically, the control unit 10 adds the number of pages executed for the print job to the execution counter of the print job of the relevant user shown in the history information management table of FIG. 5. If both color prints and black and white prints exist, the control unit 10 calculates the number of pages for each based on the page information, and adds the number to the corresponding execution counter.

If the print job has any cancellation factor, and it has been judged in Step S104 that the cancellation flag is ON, the control unit 10 proceeds to the processing of Step S112 and prepares for outputting the $n^{th}$ page, thereby acquires required information and generates the page information, and stores the page information in the page information part of cancelled-job processing information (Step S113).

Then, the control unit 10 judges whether there is the next page remaining to be output (Step S114). If there is (Step S114: YES), the control unit 10 increments n by "1" in Step S115, and returns to the processing of Step S112 to repeat the aforementioned Steps.

FIG. 9 shows an example of the cancelled-job processing information that is generated when a print job has been cancelled. The difference from FIG. 8 is that in the job information part, "cancelled" is written into the "result", "cancellation factor" is added (In the example of FIG. 9, "overlimit" is written as the cancellation factor.), and the end time is shown as an estimated end time. The estimated end time can be calculated by adding an estimated print time to the start time. The ROM 14 prestores a time required for printing one page, for each of the black and white printing and the color printing. Accordingly, it is easy to calculate the estimated print time if the number of pages to be printed is acquired.

The "processed pages" is the number of pages that have been already processed without being cancelled, included in "the total pages".

Upon finishing the storage of the page information of all the pages, the control unit 10 writes the estimated end time into the canceled-job processing information and stores the cancelled-job processing information in the history information storage unit 17 (Step S114: YES, Step S116). At the same time, the control unit 10 updates the cancellation history information based on the cancelled job processing information (Step S117). Here, the number of cancelled pages is added to the corresponding virtual count. Also in this case, if both color prints and black and white prints exist, the control unit 10 calculates the number of pages for each, and adds the number to the corresponding virtual count. If there are any processed pages, the execution history information is updated at the same time based on the number of processed pages.

Next, the control unit 10 transmits, via the LAN 6, notification about the cancellation of the print job and the cause thereof to the IP address of the client terminal that has issued the job (Step S118).

Upon receiving the notification, the client terminal 3 displays the notification on the monitor thereof. Accordingly, the user can know the cancellation of the job that the user has issued and the cause thereof. As a result, the user can easily address the cancellation, for example by reissuing the job to another MFP, or changing the configuration of the job.

Upon completion of the above-described Steps, the control unit 10 returns to the processing of the main routine (not illustrated) for controlling the operations of the whole of the MFP 1.

In the case where the user directly controls the MFP 1 to execute the job, the user inputs the user ID and various conditions for the job processing, and such input data is temporarily stored in the RAM 13. Accordingly, in Step S201 of FIG. 7, the information required for the job management is acquired from the RAM 13, not from the header of the print job data. Also, in Step S118 of FIG. 6, the display unit 31 of the operation panel 30 displays the cancellation factor and so on, to provide the notification to the user.

In the print job history information storage processing of FIG. 6, if the cancellation flag is ON in Step S104, the cancellation history update processing of Steps S112 to S117 follows the Step S104. However, if there is another queuing job, the priority given to the cancelled job may be lowered and the queuing job may be executed by priority, and then the cancellation history update processing may be performed as to the cancelled job. As a result, it is possible to avoid that execution of an executable job is unnecessarily delayed due to the job cancellation.

<Administrator Mode Execution Processing>

Figure 10:
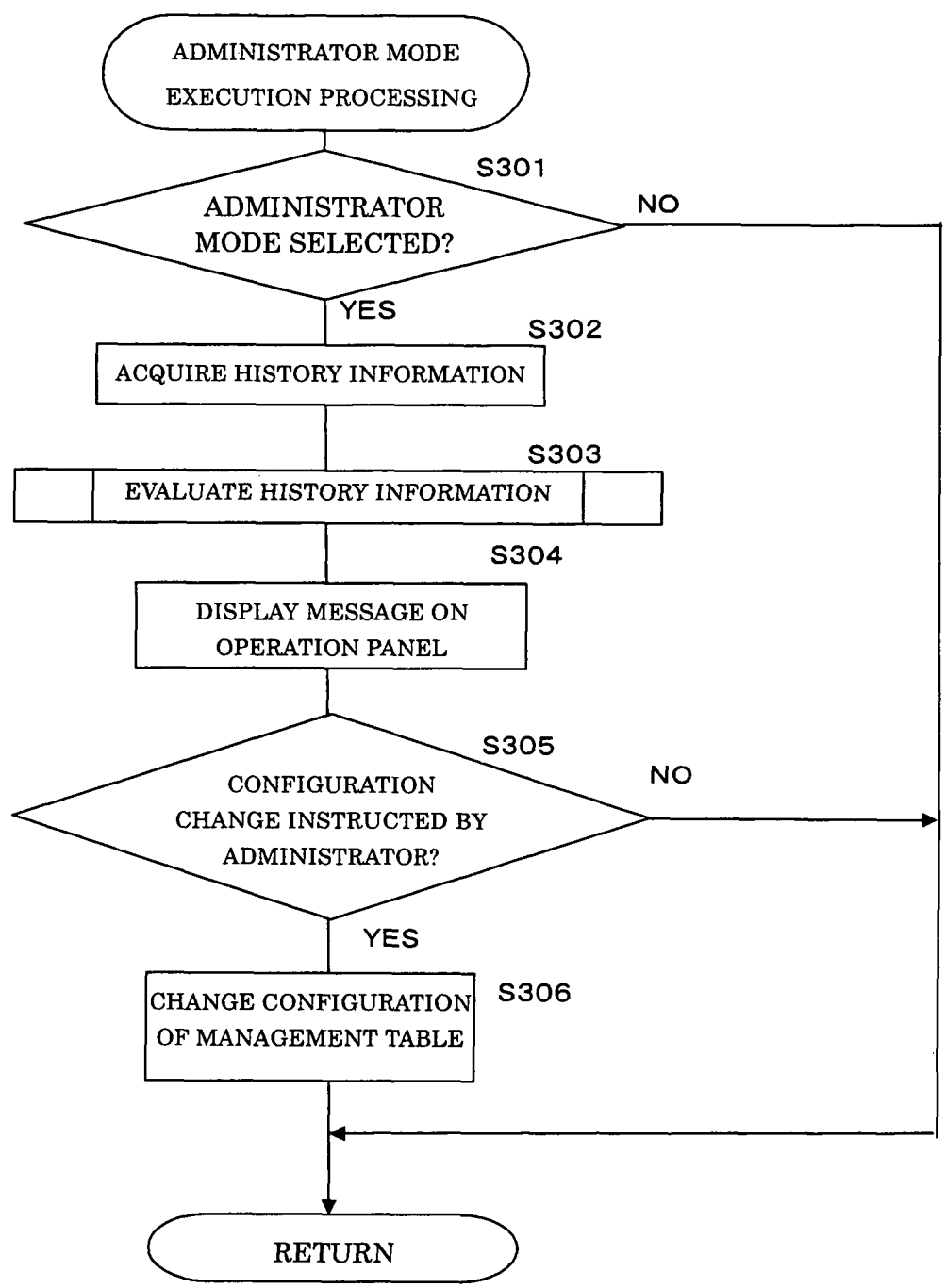
FIG. 10 is a flowchart showing administrator mode execution processing executed by the control unit.

FIG. 10 is a flowchart showing administrator mode execution processing that is executed by the control unit 10 when the administrator of the MFP 1 changes the management configuration.

Firstly, the control unit 10 judges whether the administrator mode has been selected by the administrator (Step S301: YES). The operation for selecting the administrator mode is executed upon reception of a particular password assigned to the administrator is input by the administrator from the operation panel 30, for example.

Upon selection of the administration mode, the control unit 10 reads the cancellation history information from the history information storage unit 17, and evaluate the information (Steps S302, S303).

With this regard, a cancellation history information management table having a cutoff date that has been passed may be automatically selected with reference to a clock IC included within the CPU 11. Alternatively, the administrator may select a desired date from the operation panel 30.

Figure 11:
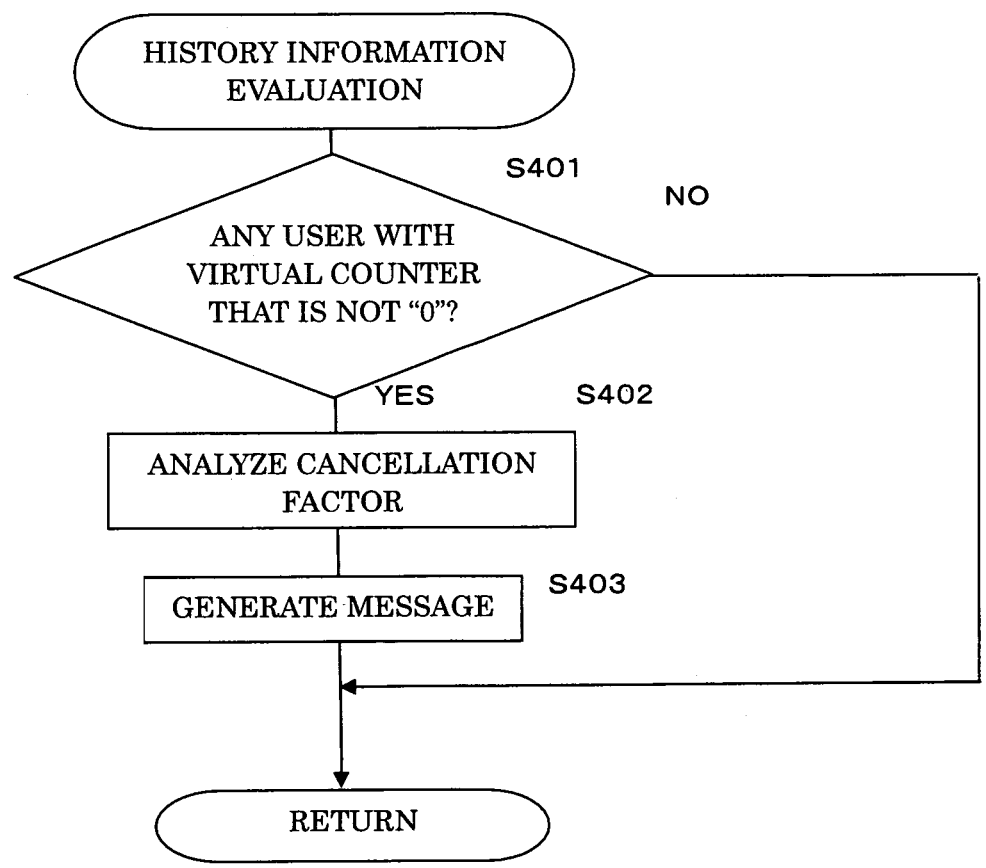
FIG. 11 is a flowchart showing subroutine for history information evaluation processing executed in Step S303 of FIG. 10.

FIG. 11 is a flowchart showing the subroutine for the aforementioned evaluation processing. In Step S401, the control unit 10 searches the cancellation history information of the history information management table of FIG. 5 to check whether there is any user whose virtual counter does not indicates "0". If there is such a user, this means that job cancellation has been executed. Accordingly, the control unit 10 analyzes a factor that has caused the cancellation (Step S402).

The cancellation factor can be analyzed by searching the cancelled job processing information (see FIG. 9) of the relevant month for the relevant user, to refer to the "cancellation factor".

The ROM 14 (FIG. 2) stores message templates to be applied in accordance with each of the cancellation factors. Using the templates, the control unit 10 generates a specific message for reference by the administrator (Step S403), and returns to the processing illustrated in the flowchart of FIG. 10.

In Step S401, if all the virtual counters indicate "0", this means that no job has been cancelled within the management period. Accordingly, the control unit 10 returns to the processing illustrated in the flowchart of FIG. 10 immediately.

In Step S304 of FIG. 10, if any message has been generated in the aforementioned Step S403, the control unit 10 displays the generated message on the display unit 31 of the operation panel 30.

Specifically, in the case where a color print job and a black and white print job each have been cancelled due to the overlimit of the print counts, a message for proposing upward revision of the upper limit for the user is displayed.

With this regard, if the upper value of the total counts allocated for the division that the relevant user belongs to is fixed, the massage may propose to decrease the upper limit for a user who belongs to the same division and whose remaining counts is the largest among the other users, and add the count to the upper limit for the user of the cancelled job.

Figure 12:
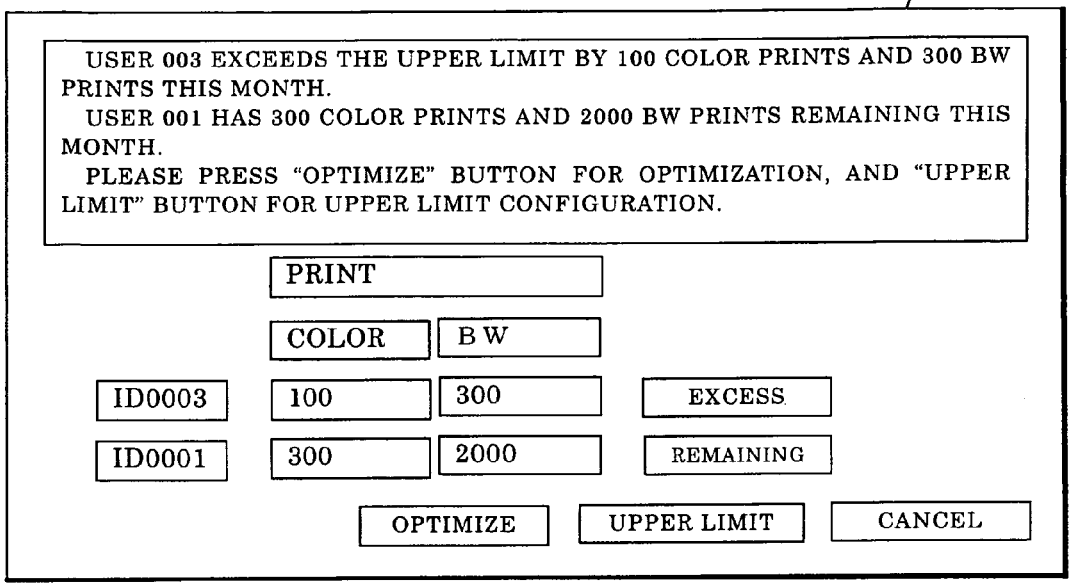
FIG. 12 is a first example message to an administrator displayed in accordance with a cancellation factor.
Figure 13:
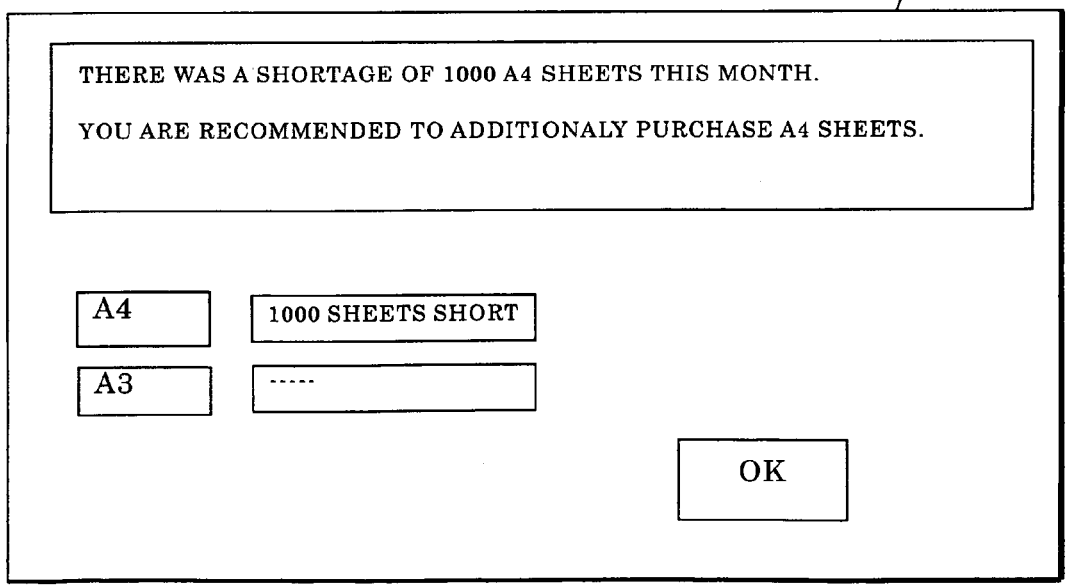
FIG. 13 is a second example message to the administrator displayed in accordance with a cancellation factor.

FIG. 12 shows an example of message displayed on the display unit 31 of the operation panel 30.

In this example, the message shows that the virtual counters of the color prints and the black and white prints for the user ID 0003 (user 003) are respectively "100" and "300", all the cancellation factors are the "overlimit", and remaining counts for the user ID 0001 (user 001) is the largest (300 counts for color prints and 2000 counts for black and white prints). The message also instructs the administrator to press the "optimization button" to optimize the upper limit, and press the "upper limit configuration button" to configure the upper limit for the user 003.

If the administrator presses the optimization button, the control unit 10 changes the upper limits of the color prints and the black and white prints for the user ID 0003, included in the management table stored in the job management information storage unit 16, by adding the excess values beyond the limits to the counts respectively. Regarding the user ID 0001 belonging to the same division, the control unit 10 subtracts the excess values from the upper limits of the color prints and the black and white prints. With these operations, it is possible to immediately suppress occurrence of cancelled jobs of a particular user without exceeding the total upper limit allocated to the division. Therefore, more reasonable configuration of the management conditions can be realized.

If the administrator presses the upper limit configuration button, the job management table of FIG. 4 is displayed. For example, the administrator can designate a value to be changed by touching the panel, and change the value by inputting upper limit for the job using the numeric key pad.

If the administrator inputs the value of the upper limit and presses the OK button (not illustrated), control unit 10 registers the configuration change (Step S305: YES, Step S306). If the administrator judges that it is unnecessary to change the upper limit, the administrator presses the cancel button (Step S305: NO), and the control unit 10 returns to the processing of the main routine (not illustrated).

As described above, in this embodiment, the ROM 14 stores an evaluation program for determining a message and a recommendation to be displayed in accordance with the cancellation factors and the counter values included in the history information. In accordance with the program, the control unit 10 displays a required configuration screen on the display unit 31 of the operation panel 30. The administrator can change the configuration of the management data by inputting prescribed conditions. As a result, it is possible to realize the reasonable job management that fulfills the users' demand.

MODIFICATION EXAMPLES

The present invention is explained above based on the embodiment. However, the present invention is not limited to this. The following are possible modification examples.

(1) Other Examples of a message displayed when administrator mode is set

In the embodiment above, an example message for the case where the cancellation factor of the print job is the overlimit. Different messages are prepared for other factors.

For example, if the cancellation factor is shortage of A4 size paper, a message for prompting the user to purchase A4 size paper may be displayed. Conventionally, it has been impossible for the administrator to know the reason for the job cancellation. Accordingly, it has been impossible to know the exact amount of paper to be supplied. However, with the present invention, it is possible to supply a sufficient amount next month, in accordance with such a message. This mitigates the inconvenience to the users.

If the cancellation factor is that the user has requested a print job using letter size paper even though no letter size paper is in the paper box, a message shown in FIG. 14 may be displayed. The message recommends the user to print the data on the A4 size paper as an alternative to the letter size paper. If this is the case, when the user presses the OK button, such a print setting may be set for using alternative paper afterward. Alternatively, it is possible to simply display a message that recommends the user to purchase prescribed sheets of letter size paper, as FIG. 15 shows.

Regarding jobs in the other types, such as a scan job and a copy job, a recommendation message may be displayed to an appropriate administrator in accordance with the cancellation factor.

(2) In the embodiment above, the history information is evaluated and a message that recommends to change the management conditions based on the evaluation result is displayed by the display unit 31. Then, the control unit 10 changes the management conditions upon reception of input by the administrator. However, it is possible to use a computer program for automatic configuration change by which the control unit 10 automatically optimizes the management conditions based on the evaluation result.

Figure 16:
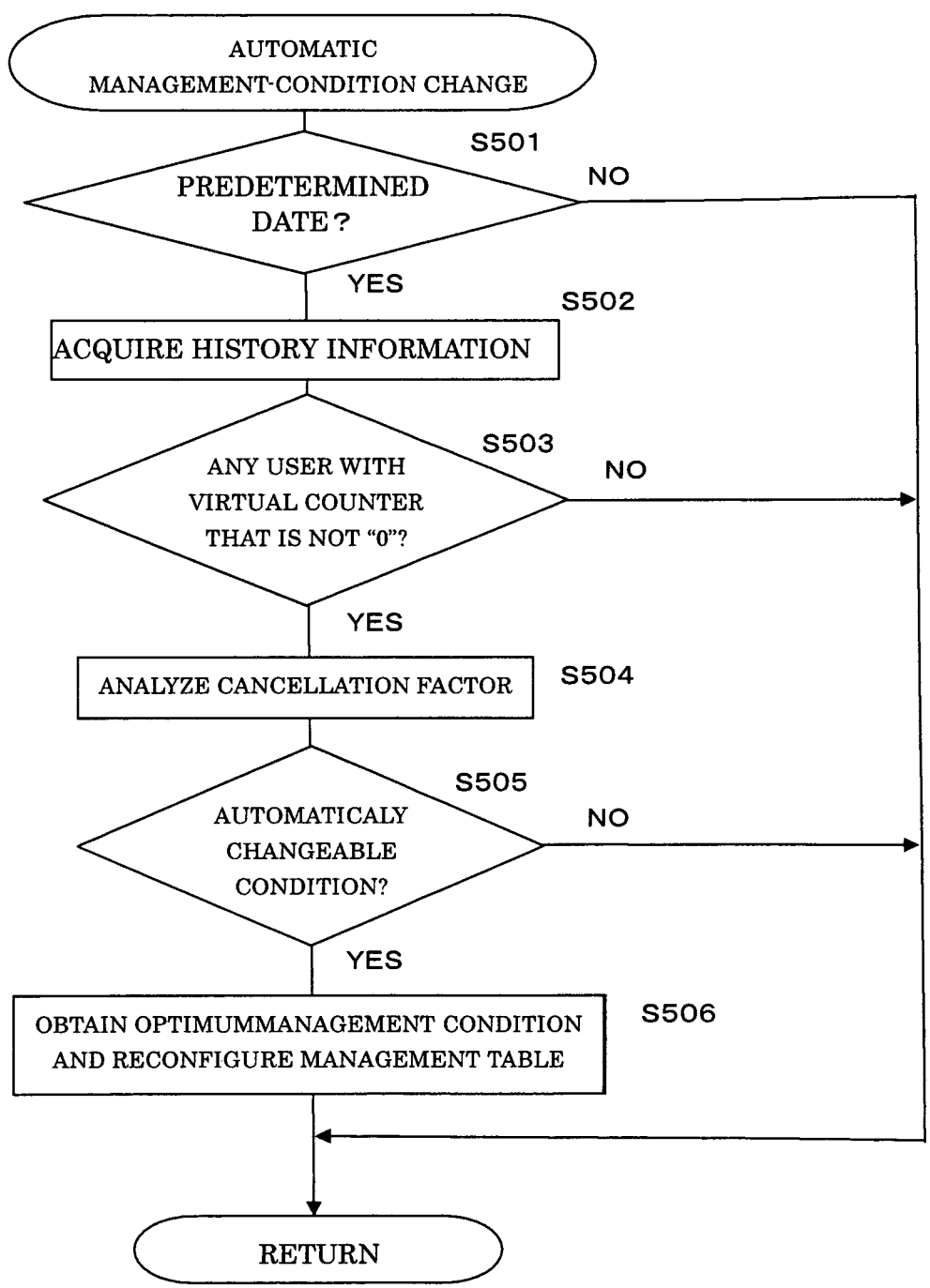
FIG. 16 is a flowchart showing automatic configuration change processing executed by the control unit.

FIG. 16 is an example flowchart showing the automatic configuration change performed by the control unit 10.

Firstly, the control unit 10 monitors the clock IC included in the CPU 11 to check whether the current date is a predetermined date (e.g. 5 p.m. on the cutoff day) previously specified by the administrator or the like (Step S501). If the current date is the predetermined date, the control unit 10 acquires the history information of the month (see FIG. 5) from the history information storage unit 17 (Step S501: YES, Step S502) to check whether there is any user whose virtual counter is not "0" (Step S503). If there is such a user, the control unit 10 analyzes the cancellation factor of the job (Step S504). If the management conditions can be automatically changed for resolving the cancellation factor, the control unit 10 obtains optimum management conditions and changes the conditions in the management table in accordance with the optimum conditions. Then, the control unit 10 returns to the processing of the main routine which is not illustrated (Step S505: YES, Step S506).

In Step S505, the control unit 10 can judge whether the management conditions can be automatically changed by judging whether the cancellation factor is that previously specified by the administrator or the like. Of course, this Step is unnecessary if the conditions should be automatically changed as to all the cancellation factors.

The procedure for obtaining the optimum conditions in Step S506 is preprogrammed in correspondence with cancellation factors. For example, as described in the embodiment above, if the cancellation factor of a user is the overlimit, the control unit 10 changes the upper limit by adding the excess value beyond the upper limit to the upper limit. If this is the case, to avoid exceeding the total upper limit allocated to the division that the user belongs to, the upper limit(s) for one or more users who belong to the division and whose counts does not reach the upper limit is reduced at the same time. In view of necessity for job management, one having ordinary skill in the art would be able to apply various methods for the optimization.

(3) In the embodiment above, the management of print jobs that the MFP receives from the client terminals is mainly described. However, regarding jobs in the other types, such as scan jobs and copy jobs, it is also possible to change or add the conditions based on the job type, job properties and the likes that the administrator wishes to manage.

For example, in the case of a scan job, it is possible to use, as the upper limit, the storage capacity of the storage device that stores the scanned image, for example, as well as the scan counts described above. This storage device corresponds to the file server 2 as the external storage device in the embodiment. Of course, the storage capacity of an internal storage device that the MFP includes therein may be used as well.

The job processing information generated in this case is almost the same as that of FIG. 8 and FIG. 9. However, it includes, as the job specification information, the address (IP address or e-mail address) on the network of the transmission destination and the protocol type, such as TFP, used for transmission of the data.

Also, the storage capacity required for storing image data of scanned pages may be added to the page information.

The cancellation factors of a scan job may include, in addition to the overlimit of the scan count, overlimit of the storage capacity, capacity shortage of a transmission buffer in the case of temporally storing the image data in the transmission buffer before transmitting the scanned image, a transmission failure on a network, a failure of the scanner unit 210, and so on.

Also, in the case of a MFP that includes a modem and has a FAX transmission function with use of a telephone line, destination fax numbers and the likes may be included in the job information. Also, in this case, the cancellation factors may include overlimit of the transmission count, overlimit of telephone charge, a reception failure of the destination fax machine due to paper shortage, and so on.

In the case of a copy job, almost the management conditions as the case of the print job may be used. However, in addition to the above-mentioned cancellation factors of the print job, a failure of scanner unit 220 may be considered.

(4) When displaying a message as a result of evaluation of the history information, the history information management table shown in FIG. 5 may be displayed together with the message. Alternatively, the history information management table may be selectively displayed in accordance with an instruction input from the administrator or the like.

It is unnecessary to display a recommendation message as to every cancellation factor. It is possible to display the history information management table or only the cancellation history information in particular, without displaying evaluation result of the history information and the recommendation message. This is because the administrator can precisely know the need of the user who has exceeded the upper limit, with reference to the value of the virtual counter included in the cancellation history information. Moreover, such information enables the administrator to counsel or instruct the user as to the manner of issuing jobs, and greatly helps the administrator determine the job management conditions for the future.

The history information management table is not limited to that shown in FIG. 5. For example, as FIG. 17 shows, monthly cancellation history of color print jobs occurred in one year may be displayed. It is possible to generate a list relating to various items of history by acquiring necessary information from the job processing information shown in FIG. 8 and FIG. 9 and editing the information.

(5) In the description above, the recommendation message and so on as a result of the evaluation of the history information is displayed on the display unit 31 of the operation panel 30 of the MFP 1. However, it is useful if the message is displayed on the display unit (monitor) of the client terminals 3, 4 and 5.

As a result, the administrator can know the use of the MFP 1 by each user, without going and checking on the MFP 1. Moreover, if every user can check the history information from the client terminal 3, 4 or 5 near the user, the user can precisely know the status of his job, and controls the job requests by himself for the future.

If this is the case, for example, the client terminal 3 transmits a request for transmitting desired history information to the MFP 1, and the MFP 1 receives the request and transmits the history information to the client terminal 3 as a request source.

For this purpose, a well-known protocol (e.g. FTP) can be used as a communication protocol.

Then, the client terminal 3 displays the history information received from the MFP 1 on the display unit thereof.

In this modification example, the client terminals 3, 4 and 5 are all usual personal computer. Apart from that the data requested to the MFP 1 is the "history information" of the image processing jobs issued by each user, the modification example can be well-understood and implemented by one having ordinal skill in the art, based on well-known communication protocols and the explanation of the embodiment above. Accordingly, no flowchart is presented for explaining the modification.

(6) The program pertaining to the job management of the embodiment above is recordable on various types of computer-readable recording media, including a magnetic disk such as a flexible disk, an optical recording medium such as a DVD, a CD-ROM, a CD-R and a MO, a flash memory as a Smart Media™ and a compact Flash™. The program may be produced and transferred in the form of the above-described recording media, and also may be transmitted and provided through various wired and wireless networks including the internet, broadcast network, telecommunication network, satellite communication.

Also, the program for realizing the present invention does not necessarily include all the modules required for causing a computer to execute the above-described processing. For example, it is possible to use a general-purpose programs that can be individually installed in the information processing apparatus, such as a communication program and programs included in the operating system (OS), to cause a computer execute the above-described processing.

(7) In the embodiment above, the control unit 10 functions as the "cancellation part" for example, by executing a program stored in the ROM 14. However, this function may be realized by dedicated hardware (e.g. Integrated Circuit) in which the program for the cancellation part is installed.

(8) In the embodiment above, the case where the present invention is applied to an MFP as an example of the image processing apparatus is described in detail. However, the image processing apparatus pertaining to the present invention is not limited to an MFP. Any other apparatus that executes image processing jobs and can be a target of the job management by the administrator may be used. For example, the present invention may be applied to a specialized printer, a specialized scanner a specialized copier, a specialized fax machine and so on.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus that manages execution load of jobs issued by each user, comprising:
 a management condition storage operable to store, as a management condition that has been set for each user, an upper limit of execution load of jobs that each user is allowed to apply on the image processing apparatus;
 a total value storage operable to store therein, for each user, a total value of execution load applied on the image processing apparatus through execution of jobs issued by the respective user;
 a canceling part operable to cancel a received job in response to the received job causing the total value of execution load to exceed the upper limit for the respective user who issued the received job;
 a cancellation history storage operable to store therein, for each user, cancellation history information that shows a value of execution load of jobs on the image processing apparatus that exceeds the upper limit for the respective user;
 an evaluation part operable to evaluate the management condition for each user based on the stored cancellation history information for the respective user and provide a recommendation to change the management condition for the respective user based on the stored cancellation history information; and
 a display part operable to display, as a result of the evaluation performed by the evaluation part, information including the recommendation to change the management condition for the respective user.

2. The image processing apparatus of claim 1, wherein the cancelled job is an image formation job for forming images on a recording sheet, and
 the cancellation history information shows an image formation count included in the cancelled job, estimated on an assumption that the job cancelled by the canceling part had been actually executed.

3. The image processing apparatus of claim 1, wherein the cancelled job is an image scan job for scanning images from a document to generate image data, and
 the cancellation history information shows an image scan count included in the cancelled job, estimated on an assumption that the job cancelled by the canceling part had been actually executed.

4. The image processing apparatus of claim 1, wherein the display part displays the cancellation history information, in addition to the result of the evaluation performed by the evaluation part.

5. The image processing apparatus of claim 1, further comprising:
 a changing part operable to change the management condition according to the result of the evaluation performed by the evaluation part.

6. The image processing apparatus of claim 1, further comprising:
 an input receiver operable to receive a user's input for changing the management condition; and
 a changing part operable to change the management condition stored in the management condition storage part, in accordance with the user's input.

7. The image processing apparatus of claim 1, further comprising:
 a request receiver operable to receive, from a client terminal, a request for transmitting the cancellation history information; and
 a transmitter operable to transmit the cancellation history information to the client terminal upon reception of the request.

8. The image processing apparatus of claim 1, wherein the result of the evaluation includes a recommendation to raise the upper limit for a user whose total value of the execution load has reached the upper limit.

9. The image processing apparatus of claim 1, wherein the result of the evaluation includes a recommendation to raise the upper limit for a user whose total value of the execution load has reached the upper limit by an excess from the upper limit, and to lower the upper limit for another user that belongs to the same division as the user by the excess.

10. An image processing system in which an image processing apparatus that manages execution load of jobs issued by each user and a client terminal are connected to each other to establish communications therebetween, the image processing apparatus comprising:
 a management condition storage operable to store, as a management condition that has been set for each user, an upper limit of execution load of jobs that each user is allowed to apply on the image processing apparatus;
 a total value storage operable to store therein, for each user, a total value of execution load applied on the image processing apparatus through execution of jobs issued by the respective user;
 a canceling part operable to cancel a received job in response to the received lob causing the total value of execution load to exceed the upper limit for the respective user who issued the received job;
 a cancellation history storage part operable to store therein, for each user, cancellation history information that shows a value of execution load of jobs on the image processing apparatus that exceeds the upper limit for the respective user;
 an evaluation part operable to evaluate the management condition for each user based on the stored cancellation history information for the respective user and provide a recommendation to change the management condition for the respective user based on the stored cancellation history information;
 a first receiver operable to receive a request for transmitting a result of an evaluation performed by the evaluation part from the client terminal; and
 a first transmitter operable to transmit the result of the evaluation to the client terminal upon reception of the request,
 the client terminal comprising:
 a second transmitter operable to transmit the request to the image processing apparatus;
 a second receiver operable to receive the result of the evaluation from the image processing apparatus; and
 a display part operable to display the received result of the evaluation performed by the evaluation part, information including the recommendation to change the management condition for the respective user.

11. The image processing apparatus of claim 10, wherein the result of the evaluation includes a recommendation to raise the upper limit for a user whose total value of the execution load has reached the upper limit.

12. The image processing apparatus of claim 10, wherein the result of the evaluation includes a recommendation to raise the upper limit for a user whose total value of the execution load has reached the upper limit by an excess from the upper limit, and to lower the upper limit for another user that belongs to the same division as the user by the excess.

13. A job management method used in an image processing apparatus that manages execution load of jobs issued by each user, comprising:
- a step of storing, as a management condition that has been set for each user, an upper limit of execution load of jobs that each user is allowed to apply on the image processing apparatus;
- a step of storing, for each user, a total value of execution load applied on the image processing apparatus through execution of jobs issued by the respective user;
- a canceling step of canceling a received job in response to the received job causing the total value of execution load to exceed the upper limit for the respective user who issued the received job;
- a cancellation history storage step of storing, for each user, cancellation history information that shows a value of execution load of jobs on the image processing apparatus that exceeds the upper limit for the respective user;
- a step of evaluating the management condition for each user based on the stored cancellation history information for the respective user and provide a recommendation to change the management condition for the respective user based on the stored cancellation history information; and
- a display step of displaying, as a result of the evaluation performed by the step of evaluating, information including the recommendation to change the management condition for the respective user.

14. The job management method of claim 13, wherein the result of the evaluation includes a recommendation to raise the upper limit for a user whose total value of the execution load has reached the upper limit.

15. The job management method of claim 13, wherein the result of the evaluation includes a recommendation to raise the upper limit for a user whose total value of the execution load has reached the upper limit by an excess from the upper limit, and to lower the upper limit for another user that belongs to the same division as the user by the excess.

16. A nontransitory computer-readable recording medium having recorded thereon a job management program that is executed by an image processing apparatus that manages execution load of jobs issued by each user, the job management program comprising:
- a step of storing, as a management condition that has been set for each user, an upper limit of execution load of jobs that each user is allowed to apply on the image processing apparatus;
- a step of storing, for each user, a total value of execution load applied on the image processing apparatus through execution of jobs issued by the respective user;
- a canceling step of canceling a received job in response to the received job causing the total value of execution load to exceed the upper limit for the respective user who issued the received job;
- a cancellation history storage step of storing, for each user, cancellation history information that shows a value of execution load of jobs on the image processing apparatus that exceeds the upper limit for the respective user;
- a step of evaluating the management condition for each user based on the stored cancellation history information for the respective user and provide a recommendation to chancre the management condition for the respective user based on the stored cancellation history information; and
- a display step of displaying, as a result of the evaluation performed by the step of evaluating, information including the recommendation to change the management condition for the respective user.

17. The job management program of claim 16, wherein the result of the evaluation includes a recommendation to raise the upper limit for a user whose total value of the execution load has reached the upper limit.

18. The job management program of claim 16, wherein the result of the evaluation includes a recommendation to raise the upper limit for a user whose total value of the execution load has reached the upper limit by an excess from the upper limit, and to lower the upper limit for another user that belongs to the same division as the user by the excess.

* * * * *